United States Patent [19]
Maillet et al.

[11] Patent Number: 5,708,062
[45] Date of Patent: Jan. 13, 1998

[54] BITUMEN COMPOSITIONS

[75] Inventors: Jérôme Maillet, Kyoto; Jacques Komornicki, Hyogo; Yoshiyuki Miyaki, Shiga; Hiroshi Mohri, Chiba; Satoshi Tada, Kanagawa, all of Japan; Patrice Perret, Serquigny, France; Sabine Gazeau, Paris, France; Bernard Brule, Epinay-sur-Seine, France; Kentaro Shiojiri, Tokyo, Japan

[73] Assignees: Elf Atochem S.A., Puteaux; Enterprise Jean Lefebvre, Neuilly-sur-Seine, both of France

[21] Appl. No.: 722,250

[22] PCT Filed: Jan. 20, 1996

[86] PCT No.: PCT/FR96/00159

§ 371 Date: Dec. 13, 1996

§ 102(e) Date: Dec. 13, 1996

[87] PCT Pub. No.: WO96/23840

PCT Pub. Date: Aug. 8, 1996

[30] Foreign Application Priority Data

Jan. 30, 1995 [JP] Japan .................................. 7-012757
Jan. 30, 1995 [JP] Japan .................................. 7-012758

[51] Int. Cl.$^6$ ................................................. C08L 95/00
[52] U.S. Cl. .................................. 524/68; 524/59; 524/69
[58] Field of Search ................................... 524/59, 68, 69

[56] References Cited

U.S. PATENT DOCUMENTS

| 5,306,750 | 4/1994 | Goodrich et al. | 524/59 |
| 5,331,028 | 7/1994 | Goodrich | 524/68 |
| 5,556,900 | 9/1996 | Goodrich et al. | 524/59 |
| 5,576,363 | 11/1996 | Gallagher et al. | 524/59 |
| 5,604,274 | 2/1997 | Gallagher et al. | 524/69 |

OTHER PUBLICATIONS

Abstract in English, JP 61-215658.

*Primary Examiner*—Peter A. Szekely
*Attorney, Agent, or Firm*—Pennie & Edmonds

[57] ABSTRACT

The invention relates to improved bitumen compositions including:

- (A) 100 parts of bitumen
- (B) 0.1 to 10 parts of a copolymer of an alpha-olefin, of an unsaturated epoxide and of an ester of unsaturated carboxylic acid
- (C) 0.1 to 10 parts of a copolymer of an alpha-olefin and of an ester of unsaturated carboxylic acid,
- (D) 0 to 10 parts of a thermoplastic elastomer
- (E) 0 to 10 parts of a polymer which is reactive with (B)
- (F) 0 to 10 parts of an ethylene/vinyl acetate copolymer.

These bitumens are stable when stored and resist rutting.

11 Claims, No Drawings

BITUMEN COMPOSITIONS

DESCRIPTION

The present invention relates to bitumen compositions. Bitumens are useful as sealing materials and for surfacing roads but are often too hard in winter and too fluid in summer. In addition, the coatings must resist cracking when rutted and bitumens exhibit an absence of gelling; it is also important that bitumens should be stable when stored.

The prior art has already proposed bitumens modified with various additives.

Epoxy resins, polyurethanes, rubbers, thermoplastic elastomers and thermoplastic resins are known. However, epoxy resins are not flexible enough, and this causes cracks and poor resistance to inclement weather; on the other hand, they provide good mechanical strength and resistance to alkalis. Polyurethanes have an excellent elasticity but do not stand up to inclement weather and to chemical products and require an excessively long crosslinking time, which is a difficult problem in road surfacing.

U.S. Pat. No. 5,306,750 describes bitumens modified with polymers which have glycidyl (meth)acrylate groups. A storage stability can be obtained but the viscosity is too high when the polymer content exceeds 3%; gelling prevents processing.

Modifiers of the rubber type may be latices or powders of SBR (styrene butadiene rubber), of NR (natural rubber) and SIR (styrene isoprene rubber). This is described in patents JP-B-4024034, JP-B-433120, JP-B-5423691 and JP-A-17618. The thermoplastic elastomers may be block copolymers such as SBS (styrene butadiene styrene), SIS (styrene isoprene styrene) and SEBS (hydrogenated SBS) as described in JP-B-59-13098. The thermoplastic resins may be EVA (ethylene - vinyl acetate copolymer), EEAs (ethylene - ethyl acrylate copolymers), polyethylene or polypropylene, as described in JP-B-60 47404, JP-B-1-15642 and JP-A-63 304059.

The modifiers are generally employed in a proportion of 3 to 7% by weight of the bitumen. However, the proportion must be higher if a better viscosity is wanted; on the other hand, this entails a phase separation of the modified bitumen, that is to say of the mixture of bitumen and of modifier, during transport or storage at high temperature. This results in an inhomogeneous product or a lowering of the melt fluidity.

The other known modifiers are thermoplastic epoxies described in JP-A-503543, JP-A-6116500 and JP-A-6-116333 and combinations of polymers which have glycidyl groups with styrene-based elastomers as described in U.S. Pat. No. 5,331,028. However, these modified bitumens are not sufficiently stable when stored. The modified bitumens of the present invention are stable when stored and exhibit an absence of gelling although the viscosity has been increased. The coatings resist cracking and rutting. The modified bitumens of the invention include, by weight:

(A) 100 parts of bitumen (B) 0.1 to 10 parts of a copolymer of an alpha-olefin, of an unsaturated epoxide and of an ester of unsaturated carboxylic acid (C) 0.1 to 10 parts of a copolymer of an alpha-olefin and of an ester of unsaturated carboxylic acid.

The bitumen (A) my be natural or synthetic, for example bitumens for road surfacing, natural bitumens, semiblown bitumen, bitumen partially modified with blown bitumen or any combinations thereof.

The viscosity of (A) at 60° C. is, for example, between 10 and 20000 poises, preferably 300 to 5000 poises.

(B) is a copolymer of an alpha-olefin including at least one unsaturated epoxide and at least one ester of unsaturated carboxylic acid.

The unsaturated epoxide may be chosen from:

aliphatic glycidyl esters and ethers such as allyl glycidyl ether, vinyl glycidyl ether, glycidyl maleate and itaconate, glycidyl acrylate and methacrylate, and allcyclic glycidyl esters and ethers such as 2-cyclohexene 1-glycidyl ether, diglycidyl cyclohexene-4,5-dicarboxylate, glycidyl cyclohexene-4-carboxylate, glycidyl 5-norbornene-2-methyl-2-carboxylate and diglycidyl endo-cis-bicyclo[2.2.1]-5-heptene-2,3,1-dicarboxylate.

Glycidyl (meth)acrylate is advantageously employed.

The ester of unsaturated carboxylic acid may be, for example, an alkyl (meth)acrylate, it being possible for the alkyl group to have up to 24 carbon atoms.

Examples of alkyl acrylate or methacrylate which can be employed are especially methyl methacrylate, ethyl acrylate, n-butyl acrylate, isobutyl acrylate and 2-ethylhexyl acrylate.

The alpha-olefin may be ethylene, propylene, 1-butane, isobutene, 1-pentene, 1-hexene, 1-decene, 4-methyl-1-butene, 4-methylpentene, 4,4-dimethyl-1-pentene, vinylcyclohexane, styrene, methylstyrene and styrene substituted with alkyl groups. Ethylene is advantageously employed.

The unsaturated epoxide may be grafted or copolymerized with the alpha-olefin and the ester of unsaturated carboxylic acid. Copolymerization is preferred.

(B) is advantageously an ethylene/alkyl (meth)acrylate copolymer in which the alkyl has from 1 to 10 carbons/ glycidyl (meth)acrylate, containing up to 65% by weight of (meth) acrylate, up to 10% by weight of epoxide.

The alkyl (meth) acrylate is preferably 9 to 40% of (B) and the epoxide 0.1 to 8%.

As for (C), the alpha-olefin and the ester of unsaturated carboxylic acid may be chosen from the same products already referred to in the case of (B).

(C) is advantageously an ethylene/alkyl (meth) acrylate copolymer in which the alkyl has from 1 to 10 carbon atoms and containing up to 65% by weight of (meth)acrylate.

The methacrylate is preferably from 9 to 40% by weight of (C).

The quantity of (C) is advantageously between 4 and 10 parts, preferably 7 to 10.

The quantity of (B) is advantageously between 0.5 and 4 and, preferably, 1 to 3 parts.

The quantity of (C) is advantageously 3 to 4 times the quantity of (B).

It would not constitute a departure from the scope of the invention to add 0 to 10 parts of a thermoplastic elastomer (D) containing essentially no reactive functional groups such as acids or anhydrides.

(D) may be chosen from:

the polyolefin elastomers such as ethylene/butenes, polybutenes, ethylene/propylenes and ethylene/dienes.

diene elastomers such as styrene-butadiene-styrene (SBS) blocks, styrene-isoprene-styrene blocks, styrene-butadiene blocks, polybutadiene, transpolyisoprene and styrene-ethylene-butadiene-styrenes acrylic elastomers such as the salts of ethylene-(meth) acrylic acid copolymers with metals such as Na, K, Zn, Ca and Mg polyamide elastomers such as the copolymers containing polyamide blocks and polyether blocks polyester elastomers such as the copolymers which have polyether (polytetramethylene glycol) units and rigid units derived from aromatic diacids and from ethylene glycol or from 1,4-butanediol.

(D) is preferably an SBS.

The compositions of the invention may also include 0 to 10 parts of a polymer (E) which is reactive with (B).

(E) may be chosen from the copolymers of ethylene, propylene, butylene and 4-methyl-1-pentene or from polystyrene homo- or copolymers, these copolymers including one or a number of unsaturated carboxylic acids, anhydrides thereof or derivatives thereof. (E) is preferably a poly-alpha-olefin homo- or copolymer grafted or copolymerized with an unsaturated carboxylic acid, an unsaturated carboxylic acid hydride or derivatives thereof.

The grafted or copolymerized functional groups represent 0.2 to 10% by weight of (E) and preferably 0.3 to 3%.

The compositions of the invention may also include 0 to 10 parts of an ethylene/vinyl acetate copolymer (F). The quantity of vinyl acetete may be up to 75% by weight of the copolymer (F).

The Applicant Company has also found that particular combinations of the copolymer (B) or of a copolymer (B1) of an alpha-olefin and of an unsaturated epoxide such as (B1) and differing from (B) with products chosen from (C), (D), (E) and (F) also make it possible to improve bitumens.

The alpha-olefin and the unsaturated epoxide of (B1) are chosen from the same ones as those in (B). (B1) may also include at least one vinyl ester of saturated carboxylic acid, such as vinyl acetate or vinyl propionate. The quantities of epoxide are the same as those of (B). The quantities of vinyl ester of saturated carboxylic acid are the same as those of carboxylic acid ester in (B).

The present invention therefore also relates to modified bitumens including (A) 100 parts of bitumen
(B) and/or (B1) 0.5 to 4 parts
(D) 2 to 6 parts
(C) and/or (F) 0.5 to 5 parts.

The present invention also relates to modified bitumens including:

(A) 100 parts of bitumen
(B) and/or (B1) 0.5 to 4 parts
(E) 0.4 to 4 parts
(D) 2 to 6 parts
(C) and/or (F) 0.5 to 5 parts.

The bitumen compositions of the invention may contain a catalyst which accelerates the reaction between the epoxide and the functional groups of the bitumen. Tertiary amines or organometallic compounds may be employed. The amines may be trimethylamine, benzylmethylamine, alpha-methylbenzyldimethylamine, dimethylaminomethylphenol, stearyldimethylamine, triethanolamine, tri(hydroxymethyl) aminomethane, tris(dimethylaminomethyl)phenol, s-triazine and triallyl cyanurate. The organometallic compounds may be lead octanoate, lead naphthenate, tetra-sec-butyl titanate, tin octanoate and zinc stearate.

EXAMPLES

EBA 30/02 denotes an ethylene/butyl acrylate copolymer containing 30% by weight of acrylate of MFI 2 and EBA 35/40 denotes an ethylene butyl acrylate copolymer containing 35% by weight of acrylate of MFI 40.

E/EA/GMA terpolymer denotes an ethylene/ethyl acrylate/glycidyl methacrylate (GMA) copolymer containing 24% by weight of acrylate, 8% by weight of GMA and of MFI 6.

PENE denotes the penetration of a needle, in $\frac{1}{10}$ mm at 25° C. according to NFT 66004.

RBT denotes the ring-and-ball softening temperature according to NFT 66008.

Pfeiffer PV denotes the penetrability value $=(\log_{10}800-\log_{10}PENE)/(RBT - 25)$ T.ISO is the temperature at which the dynamic shear modulus $G^*/\sin \delta$ is 1 kPa.

$\delta$ corresponds to the phase angle between the elastic component $G'$ and the viscous component $G''$.

SH/RP program test method and specification for binders, David A. Anderson, Revue générale des routes et aérodromes No. 714 January 94 p.48–52.

Demixing means the phase separation observed after storage at high temperatures where the upper and lower phases exhibit a different micromorphology frequently associated with a difference in the RBT of at least 5° C.

% demixing denotes the ratio of the mass of bitumen to the mass of the sample, the said sample having undergone storage at 165° C. for 5 days in an aluminium tube (Ex. 1 and 2).

High RBT denotes the ring-and-ball softening temperature of the upper phase (NF 66008) after a demixing test.

Low RBT denotes that of the lower phase.

Example 1

Polymers (B), (C) and (B)+(C) are added to bitumen etc. The results appear in Table 1.

TABLE 1

|  | 3% E/EA/GMA terp. | 10% 30/02 EBA | 9% 30/02 EBA 1% E/EA/GMA terp. | 8% 30/02 EBA 2% E/EA/GMA terp. | 7% 30/02 EBA 3% E/EA/GMA terp. | 4.9% 30/02 EBA 2.1% E/EA/GMA terp. | 10% 35/40 EBA | 7% 35/40 EBA 3% E/EA/GMA terp. |
|---|---|---|---|---|---|---|---|---|
| PENE | 72 | 46 | 44 | 40 | 43 | 45 | 61 | 63 |
| RBT | 54 | 70.5 | 71 | 72 | 74 | 69 | 58.5 | 66 |
| Pfeiffer PV | 0.7 | 2.76 | 2.66 | 2.58 | 2.36 | 2.23 | 1.24 | 2.79 |
| T. ISO | 73 | 94 | 95 | 94 | 94 | 84 | 71 | 86 |
| DEMIXING % RBT HIGH and RBT LOW | YES (42%) | YES | VERY LOW: 92% High: 70 Low: 77 | 8% High: 74 Low: 74 | 8% | High: 72 Low: 74 | YES (33%) 0% | NO |

Example 2

The procedure is as in Example 1 with two different bitumens.

an Nynas 70/100 bitumen with penetration at 25° C. 70/100 - 1/10 mm
an Elf bitumen of penetration at 25° C. 100 1/10 mm.

The results are in Table 2.

TABLE 2

| BITUMEN | NYNAS 70/100 | ELF | NYNAS 70/100 | ELF |
|---|---|---|---|---|
| | 10% 35/40 EBA | 10% 35/40 EBA | 7% 35/40 EBA 3% E/EA/GMA terp. | 7% 35/40 EBA 3% E/EA/GMA terp. |
| PENE | 61 | 65 | 63 | 59 |
| RBT | 58.5 | 64 | 66 | 68 |
| Pfeiffer PV | 1.24 | 2.51 | 2.79 | 2.95 |
| T.ISO | 71 | 78 | 86 | 83 |
| DEMIXING % | YES (33%) | YES (39%) | NO | NO |
| viscosity (mPa s) | | | 0% | 0% |
| 140° C. | 2200 | 2260 | 9500 | 7700 |
| 160° C. | 930 | 955 | 4000 | 4200 |
| 180° C. | 450 | 470 | 1480 | |

In the examples which follow the properties of the bitumens are evaluated using the following tests:

Wheel tracking test: Test for stability according to the test method for road surfacings published by the Japan Road Association, shows directly the creep resistance of the coating and the ruts produced by heavy vehicles. In this test the bitumen is mixed with a filler to prepare a cast sample (30×30×5 cm) and a solid wheel 20 cm in diameter rolls over the surface under a load of 6.4 kg/cm$^2$ to determine the number of passes until a deformation of 1 mm is obtained.

Stability at high temperature: A sample of bitumen is introduced into an aluminium tube of 5 cm diameter and 50 cm height and is left for 3 days at 170° C. The pipe is then cut at ambient temperature to obtain two samples from the top and the bottom and to determine the softening point, the needle penetration and the extension (at 15° C.).

Example 3

The following are added over 2 hours to 100 parts of surfacing bitumen (penetration 60/80) heated to 180° C. (% by weight):

1 part of an ethylene (70%)/butyl acrylate (27%)/glycidyl methacrylate (3%) copolymer
4 parts of a styrene-butadiene-styrene (SBS) block copolymer (Kraton 1101 from Shell)
1 part of an ethylene/vinyl acetate (EVA) copolymer containing 28% of acetate, of MFI 150.

The results are in Table 3. They show the improvement of the bitumen and the stability at high temperature after 3 days.

Example 4

The procedure is as in Example 3, but 1 part of EVA is replaced with an ethylene/butyl acrylate copolymer containing 35% of acrylate, of MFI 320.

The composition obtained is stable.

Example 5

The procedure is as in Example 3, but 1 part of ethylene/butyl acrylate copolymer containing 35% of acrylate is added.

The bitumen composition is improved.

Example 6

The procedure is as in Example 3 but 1 part of EVA is replaced with 1 part of polypropylene (Appryl 3020 from Elf Atochem).

The bitumen composition is improved.

Comparative Example 1

To 100 parts of surfacing bitumen (penetration: 60/80) heated to 180° C., 2 parts of Kraton 1101 (SBS of Example 3) are added over 2 hours at 180° C.

The bitumen obtained has a lower softening point and is not very stable; there is a large difference before the high and low portions.

Comparative Example 2

To 100 parts of surfacing bitumen (penetration: 60/80) heated to 180° C., 2 parts of ethylene/acrylate/GMA copolymer of Example 3 are added over two hours.

The bitumen shows a lower softening point and a smaller extension.

Comparative Example 3

Comparative Example 1 is repeated, but 2 parts of ethylene/acrylate/GMA copolymer of Example 3 are added.

The bitumen shows a high softening point, but gel particles after 3 days' storage at 170° C.

Comparative Example 4

Comparative Example 3 is repeated, but 1 part of the ethylene/acrylate/GMA copolymer of Example 3 and 8 parts of the SBS of Example 3 are added.

The bitumen shows poor storage behaviour. The properties of the high portion and of the low portion are very different.

Comparative Example 5

The following are added over 2 hours at 180° C. to 100 parts of surfacing bitumen (penetration: 60/80) heated to 180° C.:

4 parts of SBS of Example 3
2 parts of EVA of Example 3
1 part of an ethylene/ethyl acrylate/maleic anhydride (MAH) copolymer containing 28.5% of acrylate and 1.5% of MAH.

The bitumen has good initial properties but is not stable when stored.

TABLE 3

|  | Example | | | | raw bitumen | Comparative Example | | | | |
|---|---|---|---|---|---|---|---|---|---|---|
|  | 3 | 4 | 5 | 6 |  | 1 | 2 | 3 | 4 | 5 |
| Initial values | | | | | | | | | | |
| Softening point (°C.) | 60 | 76 | 69 | 75 | 50 | 61 | 54 | 81 | 97 | 72 |
| Needle penetration (1/10 mm) | 39 | 37 | 37 | 39 | 51 | 36 | 62 | 37 | 34 | 40 |
| Extension (15° C.) (cm) | 73 | 66 | 52 | 59 | 120+ | 54 | 13 | 62 | 71 | 103 |
| Viscosity at 135° (cP) | 2160 | 1940 | 3020 | 1980 | 360 | 1440 | 1100 | 2170 | 5000 | 2200 |
| Dynamic stability (times/mm) | 9500 | 9100 | 9300 | 10500 | 770 | 3200 | — | 7500 | — | 6200 |
| After 3 days at 170° C., high portion | | | | | | | | | | |
| Softening point (°C.) | 95 | 95 | 100 | 102 | — | 93 | 56 | — | 100+ | 87 |
| Needle penetration (1/10 mm) | 55 | 51 | 45 | 59 | — | 51 | 62 | — | 76 | 93 |
| Extension (15° C.) (cm) | 85 | 75 | 70 | 79 | — | 100+ | 15 | — | 100+ | 100+ |
| After 3 days at 170° C., low portion | | | | | | | | | | |
| Softening point (°C.) | 70 | 71 | 75 | 60 | — | 50 | 51 | — | 65 | 70 |
| Needle penetration (1/10 mm) | 36 | 34 | 40 | 35 | — | 30 | 61 | — | 25 | 21 |
| Extension (15° C.) (cm) | 40 | 47 | 46 | 359 | — | 25 | 13 | — | 10 | 0 |

Example 7

The following are added over 2 hours at 180° C. to 100 parts of surfacing bitumen (penetration 60/80) heated to 180° C.:

2 parts of ethylene/acrylate/GMA copolymer of Example 3

1 part of an MAH-grafted polypropylene containing 0.3% by weight of MAH, of Vicat point 135° C. and MFI 4 (230° C.—2.16 kg)

4 parts of Kraton 1101 SBS of Example 3.

Table 4 shows an improvement in the bitumen and stability in storage.

Example 8

The procedure is as in Example 7 but the grafted polypropylene was replaced with another grafted polypropylene containing 1% by weight of MAH which had a Vicat point of 146° C. and an MFI of 40 (190° C.—325 g).

The bitumen is improved.

Example 9

The following are added over 2 hours at 180° C. to 100 parts of surfacing bitumen (penetration: 60/80) heated to 180° C.:

1 part of the ethylene/acrylate/GMA copolymer of Example 3

1 part of a polypropylene grafted with 0.1% of MAH which has a Vicat point of 122° C. and an MFI of 4 (at 230° C.—2.16 kg)

4 parts of Kraton (SBS) of Example 3

2 parts of an ethylene/butyl acrylate copolymer containing 35% by weight of acrylate.

The bitumen is improved and the viscosity decreases.

Example 10

Example 9 is repeated but using the grafted product of Example 8 instead of that of Example 9.

The bitumen has a low melt viscosity.

Example 11

The procedure is as in Example 9 but the grafted product is replaced with another graft which is an EVA containing 28% of acetate grafted with 1% of MAH. The Vicat point is 57° C. and the MFI 6 (190° C.—2.16 kg).

The bitumen shows a relatively low viscosity and low dynamic stability.

Example 12

The following are added over 2 hours at 180° C. to 100 parts of surfacing bitumen (penetration: 150/20) heated to 180° C.:

2 parts of the ethylene/acrylate/GMA copolymer of Example 3

1 part of the grafted product of Example 7

4 parts of SBS (Kraton 1101 of Example 3).

The bitumen is improved and is stable after 3 days' storage at elevated temperature.

TABLE 4

|  | Example | | | | | |
|---|---|---|---|---|---|---|
|  | 7 | 8 | 9 | 10 | 11 | 12 |
| Initial values | | | | | | |
| Softening point (°C.) | 77 | 71 | 72 | 74 | 80 | 67 |
| Needle penetration (1/10 mm) | 35 | 34 | 37 | 38 | 36 | 75 |
| Extension (15° C.) (cm) | 38 | 42 | 56 | 62 | 54 | 49 |
| Viscosity at 135° C. (cP) | 4930 | 3720 | 2120 | 2620 | 4200 | 2020 |
| Dynamic stability (times/m) | 13700 | 11400 | 9500 | 9800 | 8500 | 4700 |
| After 3 days at 170° C., high portion | | | | | | |
| Softening point (°C.) | 79 | 76 | 85 | 75 | 90 | 75 |
| Needle penetration (1/10 mm) | 36 | 35 | 44 | 39 | 46 | 72 |
| Extension (15° C.) (cm) | 56 | 62 | 65 | 66 | 69 | 41 |
| After 3 days at 170° C., low portion | | | | | | |
| Softening point (°C.) | 69 | 65 | 65 | 69 | 75 | 70 |
| Needle penetration (1/10 mm) | 35 | 33 | 30 | 40 | 37 | 73 |
| Extension (15° C.) (cm) | 44 | 41 | 30 | 49 | 35 | 45 |

We claim:

1. Improved bitumen compositions including:

(A) 100 parts of bitumen (B) 0.1 to 10 parts of a copolymer of an alpha-olefin, of an unsaturated epoxide and of an ester of unsaturated carboxylic acid (C) 0.1 to 10 parts of a copolymer of an alpha-olefin and of an ester of unsaturated carboxylic acid.

2. Improved compositions according to claim 1, in which (B) is an ethylene/alkyl (meth)acrylate/glycidyl (meth) acrylate copolymer which has up to 65 % by weight of alkyl (meth)acrylate in which the alkyl has from 1 to 10 carbons, and up to 10% by weight of epoxide.

3. Compositions according to claim 1 or 2, in which (C) is an ethylene/alkyl (meth)acrylate copolymer in which the alkyl has from 1 to 10 carbons and containing up to 65% by weight of (meth)acrylate.

4. Compositions according to claim 1 or claim 2, in which the quantity of (C) is between 4 and 10 parts.

5. Compositions according to claim 1 or claim 2, in which the quantity of (B) is between 0.5 and 4 parts.

6. Compositions according to claim 1 or claim 2, in which the quantity of (C) is approximately 3 to 4 times the quantity of (B).

7. Compositions according to claim 1 or claim 2, also including:

(D) 0 to 10 parts of a thermoplastic elastomer (E) 0 to 10 parts of a polymer which is reactive with (B)

(F) 0 to 10 parts of an ethylene/vinyl acetate copolymer.

8. Compositions according to claim 7 in which the thermoplastic elastomer (D) is a styrene-butadiene-styrene (SBS) block copolymer.

9. Compositions according to claim 7 in which the reactive polymer (E) which is reactive with (B) is a poly-alpha-olefin homo- or copolymer grafted or copolymerized with an unsaturated carboxylic acid, an unsaturated carboxylic acid anhydride or derivatives thereof.

10. Improved bitumen compositions including:

(A) 100 parts of bitumen;

(B) and/or (B1) 0.5 to 4 parts;

(B) denoting a copolymer of an alpha-olefin, of an unsaturated epoxide and of an ester of unsaturated carboxylic acid, (B1) denoting a copolymer of an alpha-olefin and of an unsaturated epoxide and is different from (B);

(D) 2 to 6 parts of a thermoplastic elastomer (C) and/or (F) 0.5 to 5 parts;

(C) denoting a copolymer of an alpha-olefin and of an ester of unsaturated carboxylic acid; (F) denoting an ethylene/vinyl acetate copolymer.

11. Improved bitumen compositions including:

(A) 100 parts of bitumen;

(B) and/or (B1) 0.5 to 4 parts, (B) denoting a copolymer of an alpha-olefin, of an unsaturated epoxide and of an ester of unsaturated carboxylic acid; (B1) denoting a copolymer of an alpha-olefin and of an unsaturated epoxide and is different from (B);

(E) 0.5 to 4 parts of a polymer which is reactive with (B);

(D) 2 to 6 parts of a thermoplastic elastomer;

(C) and/or (F) 0 to 5 parts;

(C) denoting a copolymer of an alpha-olefin and of an ester of unsaturated carboxylic acid;

(F) denoting an ethylene/vinyl acetate copolymer.

* * * * *

UNITED STATES PATENT AND TRADEMARK OFFICE
CERTIFICATE OF CORRECTION

PATENT NO. : 5,708,062

DATED : January 13, 1998

INVENTOR : Maillet et al.

It is certified that errors appear in the above-identified patent and that said Letters Patent is hereby corrected as shown below:

On the title page, item [22], "Jan. 20, 1996" should be changed to --Jan. 30, 1996--.

Signed and Sealed this

Eighteenth Day of May, 1999

Attest:

Q. TODD DICKINSON

*Attesting Officer*   *Acting Commissioner of Patents and Trademarks*